(12) United States Patent
Thomas et al.

(10) Patent No.: US 9,862,154 B2
(45) Date of Patent: Jan. 9, 2018

(54) APPARATUSES AND METHODS FOR EFFICIENT SEALING OF VACUUM BAG SEAMS

(71) Applicant: The Boeing Company, Seal Beach, CA (US)

(72) Inventors: Charles William Thomas, Issaquah, WA (US); Gabriel Z. Forston, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 509 days.

(21) Appl. No.: 14/242,034

(22) Filed: Apr. 1, 2014

(65) Prior Publication Data

US 2015/0273809 A1 Oct. 1, 2015

(51) Int. Cl.
*B29C 70/44* (2006.01)

(52) U.S. Cl.
CPC .................... *B29C 70/44* (2013.01)

(58) Field of Classification Search
CPC B29C 63/20; B29C 70/44; B30B 5/02; B32B 37/10; B32B 37/1009
See application file for complete search history.

(56) References Cited

U.S. PATENT DOCUMENTS

| | | | |
|---|---|---|---|
| 7,186,367 B2 | 3/2007 | Hou et al. | |
| 7,413,694 B2 | 8/2008 | Waldrop, III et al. | |
| 7,862,679 B2 | 1/2011 | Kulesha | |
| 8,628,639 B2 | 1/2014 | Thompson et al. | |
| 2008/0083494 A1* | 4/2008 | Sander | B29C 66/721 156/285 |
| 2010/0112117 A1* | 5/2010 | Ross | B29C 70/443 425/388 |
| 2012/0298296 A1* | 11/2012 | Thompson | B29C 43/3607 156/285 |

* cited by examiner

*Primary Examiner* — Christopher Schatz
(74) *Attorney, Agent, or Firm* — DASCENZO Intellectual Property Law, P.C.

(57) ABSTRACT

Apparatuses and methods of the present disclosure relate to efficient sealing of vacuum bag seams for vacuum bag processing of composite parts. Vacuum bags may enclose a composite part and form a first sealed region around the composite part. The first sealed region may be sealed by vacuum bag seams to a base supporting the composite part and/or to other vacuum bags. The vacuum bag seams may be sealed with an edge sealing frame that forms a compression seal and that defines a second sealed region including the sealed seam. Vacuum applied to the second sealed region forms a vacuum moat adjacent to the seam and/or at least partially surrounding the first sealed region. Hence, minor leaks in the compressively sealed seam are mitigated by the vacuum moat and the vacuum integrity of the first sealed region is maintained despite some potential leaks in the sealed seam.

17 Claims, 5 Drawing Sheets

APPARATUSES AND METHODS FOR EFFICIENT SEALING OF VACUUM BAG SEAMS

FIELD

The present disclosure relates to apparatuses and methods for efficient sealing of vacuum bag seams.

BACKGROUND

Vacuum bag processing may be used to form composite parts, typically curing within an oven or an autoclave. For example, vacuum bagging is a common step in resin transfer molding and wet layup molding. In wet layup molding, the uncured composite part is placed, typically one layer at a time, on a base, such as a tool or lay-up mandrel, and covered by a vacuum bag, which is then sealed to the base using an adhesive sealant, typically a vacuum bag sealant tape. The sealed bag forms a vacuum tight enclosure which is evacuated during cure of the composite part.

In addition to the seal of the vacuum bag to the base, which forms a sealed seam around the composite part, vacuum bag processing may also involve other seams which need to be sealed. For example, large parts may be larger than convenient sizes of vacuum bag film. Also, parts with non-flat configurations (e.g., high aspect ratios, three-dimensional curves, and/or significant surface protrusions) may require seams and/or pleats to accommodate the part geometry.

Conventional seaming is performed one of two ways. The most common way is the use of vacuum bag sealant tape (e.g., TACKY TAPE brand butyl sealant tape). This is a semi-cured elastomeric material which is extremely tacky and easily bonds to common vacuum bag films. Typically, an operator manually smooths the seam and sealant to close any leak paths which can be very time consuming, arduous, and tedious. The second method to seam vacuum bags is heat seaming, which thermally welds two bags together. Currently, this technique is usually only performed by a manufacturer of vacuum bags prior to shipping to the user, and only in sections where the two bags can be laid flat upon each other. In any vacuum bag process, vacuum integrity is essential to produce high quality composites consistently. Accordingly, there is a need for apparatuses and methods for efficient sealing of vacuum bag seams.

SUMMARY

Apparatuses and methods of the present disclosure relate to efficient sealing of vacuum bag seams for vacuum bag processing of composite parts. Vacuum bags may enclose a composite part and form a first sealed region around the composite part. The first sealed region may be sealed by one or more vacuum bag seams to a base supporting the composite part and/or to other vacuum bags. The vacuum bag seams may be sealed with an edge sealing frame that forms a compression seal and that defines a second sealed region including the sealed seam. Vacuum applied to the second sealed region forms a vacuum moat adjacent to the seam and/or at least partially surrounding the first sealed region. Hence, minor leaks in the compressively sealed seam are mitigated by the vacuum moat and the vacuum integrity of the first sealed region is maintained despite some potential leaks in the sealed seam.

The edge sealing frame may comprise a body, a periphery section and a vacuum port. The edge sealing frame is configured to define a sealed seam region encompassing a vacuum bag edge that is part of a seam. The vacuum port is operatively connected to the sealed seam region and may be connected to a source of vacuum to evacuate the sealed seam region. The seam is sealed with a compression seal applied by the periphery section and the seal may be enhanced by evacuating the sealed seam region.

The edge sealing frame may be part of an apparatus for composite part manufacturing which comprises a base, an uncured composite part on the base, and one or more vacuum bags covering the uncured composite part. The vacuum bags may be sealed by one or more seams to the base and/or to each other to form a sealed workpiece region. Some or all of the seams may be sealed by an edge sealing frame.

The apparatus and/or the edge sealing frame may be used with methods for composite part manufacturing. Methods comprise forming at least two sealed regions and/or forming a sealed seam separating at least two regions (at least one sealed region). One of the regions formed is a sealed region (also called a first sealed region or a workpiece sealed region) that covers and/or encloses an uncured composite part. The second of the regions (also called a second sealed region or sealed seam region if sealed) may be outside of the first sealed region and/or may include, and/or may be adjacent to, the seam. The two regions are substantially fluidically isolated from each other such that a vacuum may be maintained at least in the first sealed region. Methods further comprise applying vacuum to the workpiece sealed region and applying vacuum outside the workpiece sealed region (e.g., to the sealed seam region). Methods further comprise curing the uncured composite part to form a cured composite part.

DESCRIPTION

Figure 1:
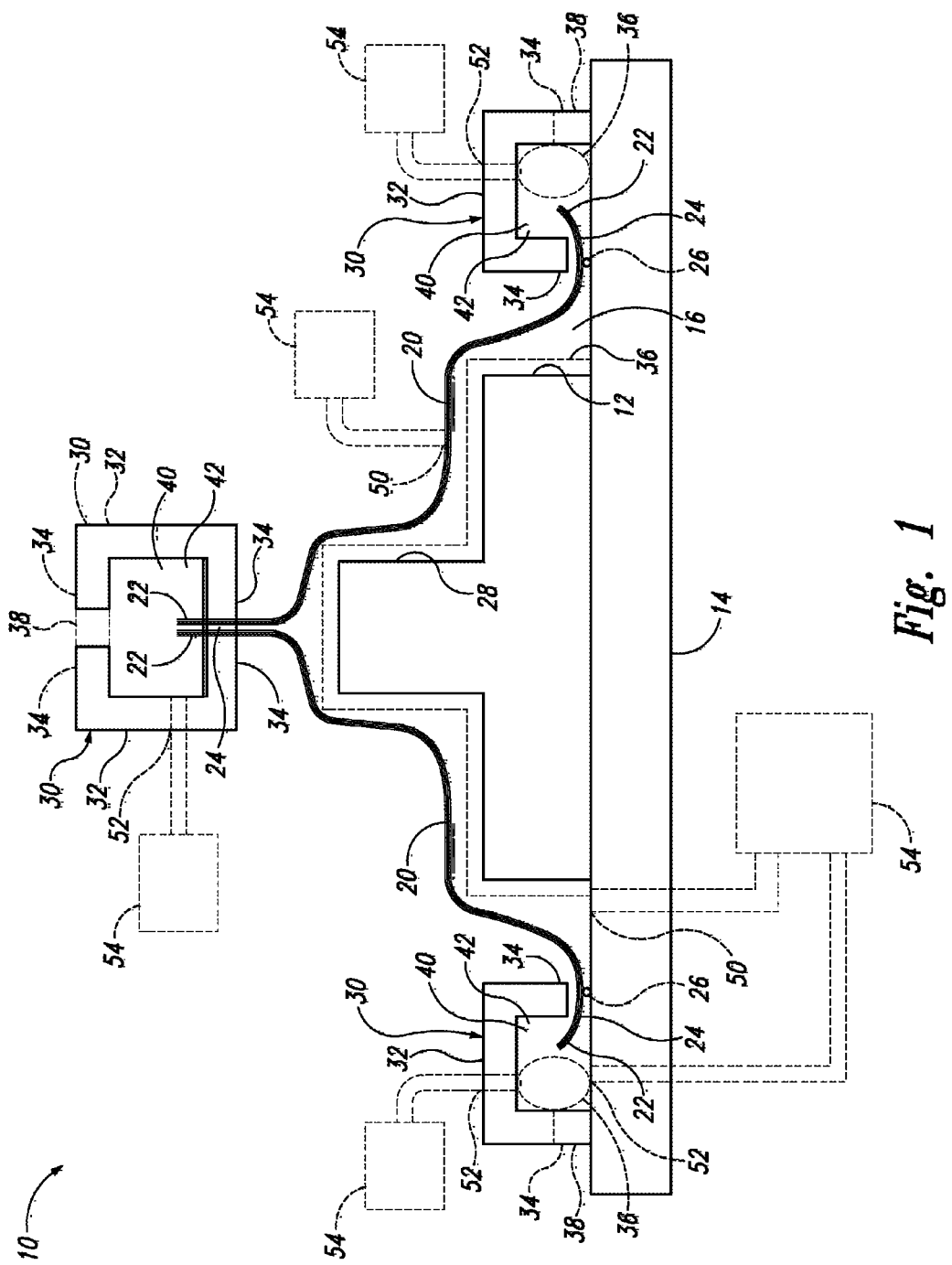
FIG. 1 is a schematic representation of apparatuses for efficient sealing of vacuum bag seams.

FIGS. 1-6 illustrate apparatuses 10 and components thereof. Elements that serve a similar, or at least substantially similar, purpose are labeled with numbers consistent among the figures. Like numbers in each of FIGS. 1-6, and the corresponding elements, may not be discussed in detail herein with reference to each of FIGS. 1-6. Similarly, all elements may not be labeled in each of FIGS. 1-6, but reference numerals associated therewith may be used for consistency. Elements, components, and/or features that are discussed with reference to one or more of FIGS. 1-6 may be included in and/or used with any of FIGS. 1-6 without departing from the scope of the present disclosure. In general, elements that are likely to be included are illustrated in solid lines, while elements that may be optional or alternatives are illustrated in dashed lines. However, elements that are shown in solid lines are not necessarily essential, and an element shown in solid lines may be omitted without departing from the scope of the present disclosure.

FIG. 1 is a schematic representation of apparatuses 10 for efficient sealing of vacuum bag seams for processing of a composite part 12. The composite part 12, also called a workpiece, may include a polymeric material with filler such as fiber, particulate, and the like. For example, the composite part 12 may be a multi-ply structure formed of fiber-reinforced plastic. As another example, composite part 12 may be a laminate material, optionally including one or more thermoplastic layers. The composite part 12 may be supported on and may be compacted against a base 14 that may be, or may include, a tool, a form, a mold, an arbor, and/or a mandrel. Although schematically illustrated as flat, the base 14 may include contours and other features that may contribute to the final form and/or shape of the composite part 12. Although schematically illustrated with a protrusion 28, composite parts 12 also may be, or may include one or more portions that are, essentially flat, sheet-like, contoured, and/or free of or include other surface features such as ribs, webs, grooves, apertures, etc. Composite parts 12 may be, or may include, structural members for devices, apparatuses, systems, and/or vehicles. For example, composite parts 12 may be, or may include, a frame, a stringer, a beam, a girder, a truss, a rib, a spar, a panel, a bulkhead, a skin (e.g., aircraft skin), and/or a plate.

Apparatuses 10 include one or more vacuum bags 20 that cover the composite part 12. Vacuum bags 20 typically are flexible, gas-impermeable materials, formed into relatively thin sheets. For example a vacuum bag 20 may be essentially composed of nylon, polyester, and/or silicone film. The vacuum bags 20 are sealed to the base 14 and/or one another by one or more seams 24. The sealed vacuum bag(s) 20 forms, defines, and/or encloses a sealed region 16 (also called a sealed workpiece region) that, together with optional base 14, encompasses the composite part 12. The vacuum bag(s) 20 is sealed to the base 14 with one or more seams 24 that extend around the periphery of the composite part 12 on the base 14. The sealed region 16 forms a vacuum chamber (a vacuum-tight, three-dimensional space) around the composite part 12. The sealed region 16 may be evacuated through a vacuum port 50, e.g., by attaching a source of vacuum 54 to the vacuum port 50. Generally, the sealed region 16 includes an open volume, i.e., at least a portion of one of the vacuum bags 20 is spaced away from the composite part 12. The open volume of sealed region 16 permits gas to flow through sealed region 16 and/or permits gas generated within sealed region 16 to be evacuated. The sealed region 16 is configured to hold a vacuum of greater than −0.5 bar, −0.9 bar, −0.97 bar, or −0.99 bar, i.e., a gas pressure of less than 50 kPa, 10 kPa, 3 kPa, or 1 kPa.

The sealed region 16 may include support structure, such as a breather 36, configured to space at least a portion of the vacuum bag(s) 20 away from the composite part 12. Breather 36 is a material configured to permit gas to flow through a sealed region, such as sealed region 16, even when the sealed region is subject to a vacuum, and/or the exterior of the sealed region is subject to pressure. Breather 36 may be a porous material that is rigid and/or resilient enough to maintain an open volume under vacuum. For example, breather 36 may be a fiber mat or a perforated tube.

Seam 24 is a mechanical junction, typically elongate, of two or more materials. Seams 24 include at least one edge 22 (or edge region) of a vacuum bag 20 (i.e., a portion of the region along the periphery of the vacuum bag 20). Seams 24 also may include another edge 22 of the same or different vacuum bag 20, and/or a portion of the base 14. For example, the seam 24 may be between two adjacent edges 22 of adjacent vacuum bags 20, as illustrated with respect to the upper seam 24 in FIG. 1. As another example, the seam 24 may be between an edge 22 and the base 14, as illustrated with respect to the lower seams 24 in FIG. 1. The materials of the seam 24 may be bonded together permanently or releasably. For example, the materials may be bonded together with a sealant 26 such as an adhesive, an elastomer, vacuum bag sealant tape, etc., and/or may be bonded together by plastic welding. Additionally or alternatively, the materials of the seam may be permanently or releasably bonded together with a compression seal, a seal formed by applying pressure, and/or force, to materials to create substantially continuous contact. A compressively sealed seam, i.e., formed by a compression seal, does not require any adhesive to form a seal. Regardless of the mechanism to seal seams 24, the seal that is formed is substantially vacuum-tight and/or substantially leak-free.

At least one of the seams 24 is sealed by an edge sealing frame 30 that is configured to apply a compression seal to the seam 24. The edge sealing frame 30 is further configured to define a sealed region 40 that encloses the seam 24. When the edge sealing frame 30 is used to seal a seam 24, lack and/or loss of vacuum integrity of the compression seal may be mitigated and/or eliminated by evacuating (e.g., applying at least a mild vacuum to) the sealed region 40, resulting in a vacuum moat configuration. In a vacuum moat configuration, no air or other gas would leak through the compression seal into the sealed region 16 that encloses the composite part 12 because air, and any other gas, is substantially eliminated in the vicinity of the compression seal (e.g., within the sealed region 40). Hence, the net seal of the seam 24 by the edge sealing frame 30 may be substantially vacuum-tight and/or substantially leak-free even if the compression seal is not.

Edge sealing frames 30 comprise a body 32, a periphery section 34, and an optional vacuum port 52. The body 32 and/or the edge sealing frame 30 is configured to form a vacuum chamber around the seam 24 (i.e., the sealed region 40). The body 32 is generally rigid and/or the edge sealing frame 30 includes support structure, such as breather 36, to space the body away from the seam 24. Thus, the body 32 and/or the edge sealing frame 30 maintains an open volume proximate to the seam 24 even when the sealed region 40 is subject to vacuum. The open volume of sealed region 40 permits gas to flow through sealed region 40 and/or permits gas generated within the sealed region 40 to be evacuated. Additionally, the open volume permits gas to be continuously evacuated from sealed region 40, e.g., to maintain the vacuum integrity of the seal of seam 24.

The sealed region 40 (also called a sealed seam region) is a three-dimensional space at least partially encompassed by the edge sealing frame 30. Other boundaries of the sealed region 40 may be defined by the base 14, vacuum bags 20, vacuum bag edges 22, and/or another edge sealing frame 30. For example, the sealed region may be defined as the space cooperatively enclosed by two or more edge sealing frames 30. The sealed region 40 defines a sealed volume 42 (also called a sealed seam volume). Upon application of a vacuum to the sealed region 40 (e.g., by applying a source of vacuum 54 to the vacuum port 52), the sealed volume 42 may change (e.g., due to deformation of the body 32 and/or periphery section 34). Edge sealing frames 30 and the sealed region 40 may include support structure, such as breather 36, configured to create and/or maintain an open volume within the sealed volume 42 of the sealed region 40. The sealed region 40 is configured to hold a vacuum of greater than −0.5 bar, −0.9 bar, −0.97 bar, or −0.99 bar, i.e., a gas pressure of less than 50 kPa, 10 kPa, 3 kPa, or 1 kPa.

Though sealed region 40 is adjacent to sealed region 16, separated primarily by seam 24, sealed region 40 is essentially fluidically isolated from sealed region 16, at least while the integrity of the seal of the seam 24 persists. That is, the vacuum (or pressure) in each of sealed region 40 and sealed region 16 may be independently controlled. When sealed region 40 is evacuated, the sealed region 40 forms a vacuum moat around seam 24 and, hence, at least partially around sealed region 16. One or more edge sealing frames 30 may be configured to define one or more sealed regions 40 that substantially, or completely, surround the perimeter of the composite part 12 on the base 14, and, hence, form a vacuum moat around the one or more seams 24 that surround the perimeter of the composite part 12 on the base 14. Additionally or alternatively, one or more edge sealing frames 30 may be configured to define one or more sealed regions 40 that substantially, or completely, surround seams 24 formed between vacuum bags 20, and, hence, form a vacuum moat around the seams 24.

The periphery section 34 of the edge sealing frame 30 is configured to form a compression seal around the seam 24 and around the sealed region 40. The periphery section 34 is configured to apply and/or transmit force (compression) to the seam 24 to form the compression seal. The periphery section 34 typically is compliant, formed of a compliant material along the periphery of the body 32. Hence, when force is applied through the periphery section 34 to the seam 24 and/or to other components to form the sealed region 40, the periphery section 34 typically conforms to form intimate contact with the opposing surface(s). Periphery sections 34 may include rubber, synthetic rubber, elastomer, fluoroelastomer, silicone, neoprene, nitrile, and/or VITON-brand fluoroelastomer.

Edge sealing frames 30, and components thereof, are configured to withstand typical processing conditions for component parts 12, which may include vacuum conditions, elevated pressure, and/or elevated temperature. For example, edge sealing frames 30 may be configured to maintain a compression seal on the seam, maintain the sealed region 40, and maintain the sealed volume 42 at typical processing conditions. Processing, which also may be referred to herein as curing, may include chemical curing, baking, compacting, laminating, consolidating, thermoforming, polymerizing, and/or cross linking. As an example of typical processing conditions, component parts 12 may be processed at an elevated temperature, and/or in an oven, such as at temperatures greater than 20° C., 100° C., 150° C., or 200° C., less than 250° C., 200° C., 150° C., 100° C., or 40° C., and/or about 20° C., about 80° C., about 120° C., or about 180° C. As another example of typical processing conditions, component parts may be processed at elevated pressures, and/or in an autoclave, such as at pressures of at least 0.1 MPa, 0.2 MPa, 0.3 MPa, 0.4 MPa, 0.5 MPa, 0.7 MPa, or 1 MPa.

Vacuum port 50 and vacuum port 52 each independently are configured to evacuate and/or vent gas from sealed region 16 or sealed region 40 respectively. Vacuum port 50 and vacuum port 52 each independently may be configured to allow gas to enter into sealed region 16 or sealed region 40 respectively, thus independently releasing vacuum that may be present in either sealed region. Vacuum port 50 is in fluid communication with sealed region 16 and may be connected through one or more vacuum bags 20. Additionally or alternatively, vacuum port 50 may be connected to sealed region 16 through any boundary of the sealed region 16, e.g., the base 14. Similarly, vacuum port 52 is in fluid communication with sealed region 40 and may be connected through the edge sealing frame 30 and/or body 32. Additionally or alternatively, vacuum port 52 may be connected to sealed region 40 through any boundary of the sealed region 40, e.g., the base 14 and/or another edge sealing frame 30. Sealed region 16 and sealed region 40 each independently may include a plurality of vacuum ports 50 or vacuum ports 52 respectively. Further, vacuum port(s) 50 and vacuum port(s) 52 may be connected to the same or different sources of vacuum 54, even if the apparatus 10 is configured for independent control of the vacuum in sealed region 16 and sealed region 40. Independent control may be achieved by incorporating different valving, piping, connection, and/or control structures between a common vacuum source 54 and the different vacuum ports.

Figure 2:
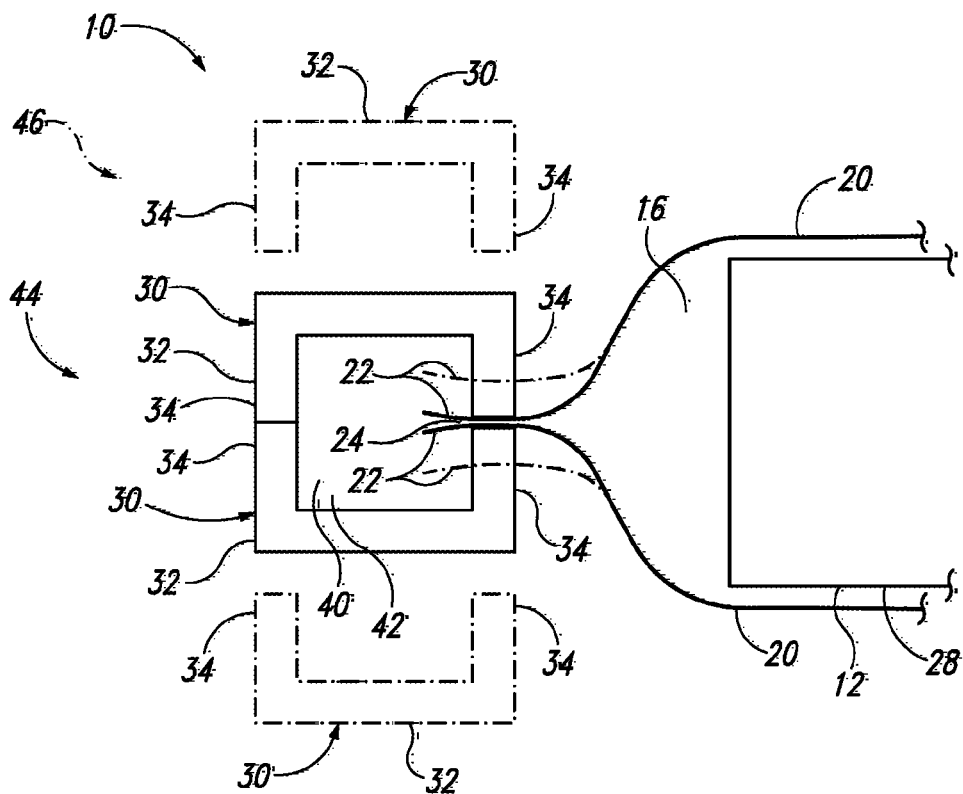
FIG. 2 is a fragmentary view of an illustrative, non-exclusive example of apparatuses for efficient sealing of vacuum bag seams, depicting an edge sealing frame to seal two vacuum bag edges.
Figure 3:
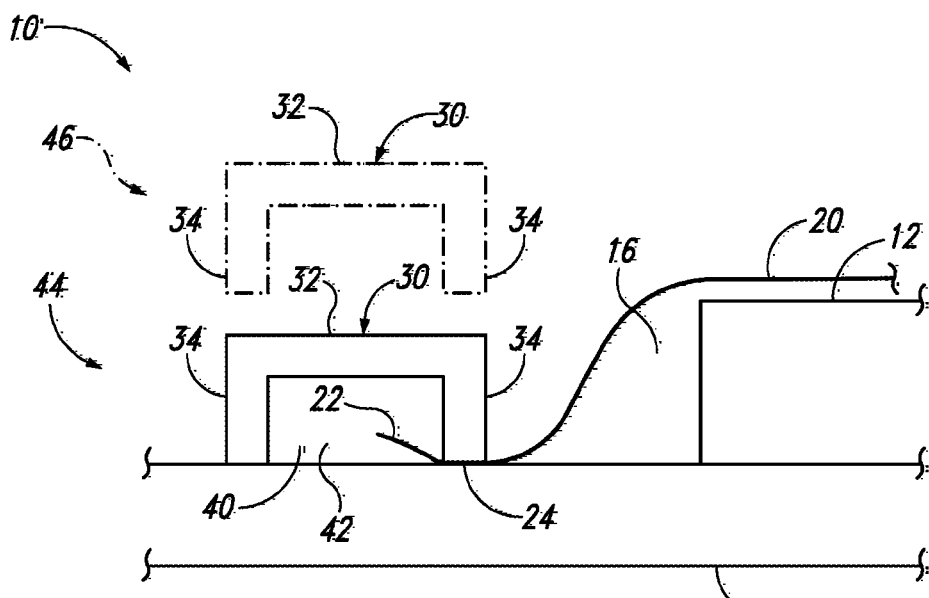
FIG. 3 is a fragmentary view of an illustrative, non-exclusive example of apparatuses for efficient sealing of vacuum bag seams, depicting an edge sealing frame to seal a vacuum bag edge to a base.

As schematically illustrated in FIGS. 2-3, edge sealing frames 30 may be configured for repeated use and may have at least two configurations: a closed configuration 44 (also described as assembled and/or active) illustrated with solid lines, and an open configuration 46 (also described as disassembled and/or inactive) illustrated with dash-dot lines. In the open configuration 46, the edge sealing frame 30 may accept a seam 24 and/or one or more vacuum bag edges 22, e.g., through an opening and/or by aligning the seam 24 and/or vacuum bag edges 22 with, or within the periphery section 34. In the closed configuration 44, the edge sealing frame 30 is closed around the seam 24 and/or edges 22, forming and/or defining the sealed region 40 that encompasses the seam 24 and/or edges 22. Also, in the closed configuration 44, the edge sealing frame 30 seals the seam 24, and/or creates a sealed seam 24 from the edge(s) 22 and/or base 14, with compressive force applied by the periphery section 34. In the closed configuration 44, the sealed region 40 may be evacuated by applying vacuum to the sealed region 40, e.g., by connecting the vacuum port 52 to a source of vacuum 54 (e.g., a vacuum pump, an evacuated volume).

Edge sealing frames 30 may be configured to transition between the open configuration 46 and the closed configuration 44 by application, or ceasing of application, of external force and/or pressure. Additionally or alternatively, the edge sealing frame 30 may be configured to transition based upon the application, or ceasing of application, of vacuum to the sealed region 40 and/or the vacuum port 52. For example, the edge sealing frame 30 may be configured such that external force (e.g., gravity and/or gas pressure) causes the periphery section 34 to contact vacuum bag edge 22, seam 24, base 14, and/or another edge sealing frame 30 to form an enclosed region around the seam 24. The external force may be sufficient to engage the periphery section 34 in a compression seal or additional force(s) may be necessary to form a compression seal and a sealed region 40, e.g., a vacuum applied to the vacuum port 52 may complete the compression seal. Additionally or alternatively, the edge sealing frame 30 may be configured to seal the seam 24 with a compression seal formed by evacuating the sealed region 40 and/or by clamping the periphery section 34 to vacuum bag edge 22 and/or seam 24. Edge sealing frames 30 may be configured to maintain the sealed volume 42 and/or the sealed region 40 when the sealed region 40 is subject to evacuation and/or the edge sealing frame 30 is subject to external pressure and/or force.

Figure 4:
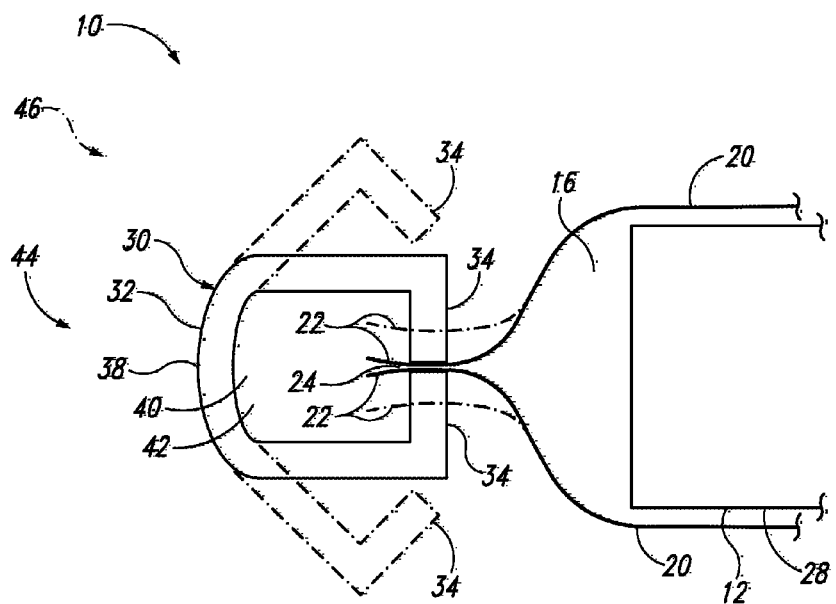
FIG. 4 is a fragmentary view of an illustrative, non-exclusive example of apparatuses for efficient sealing of vacuum bag seams, depicting a hinged, edge sealing frame to seal two vacuum bag edges.
Figure 5:
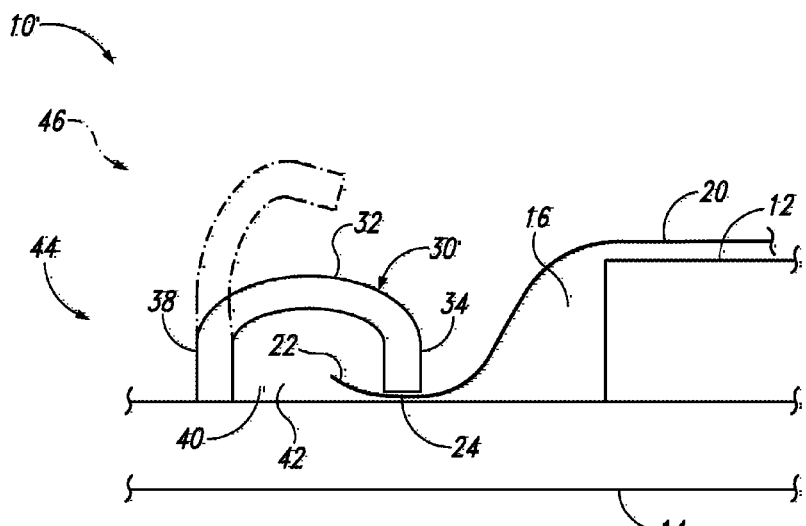
FIG. 5 is a fragmentary view of an illustrative, non-exclusive example of apparatuses for efficient sealing of vacuum bag seams, depicting a hinged, edge sealing frame to seal a vacuum bag edge to a base.

As schematically illustrated in FIGS. 4-5, edge sealing frames 30 and/or the body 32 may include a flexible portion 38 (e.g., a hinge, a flexure, and/or a living hinge) that allows the edge sealing frame 30 to transition between the closed configuration 44 and the open configuration 46. Edge sealing frames 30 and/or the flexible portion 38 may be biased (e.g., resilient and/or exerting a force) toward one or both of the closed configuration 44 and the open configuration 46. The closed configuration 44 and the open configuration 46 independently may be stable configurations and/or stable configurations upon application of a force.

Figure 6:
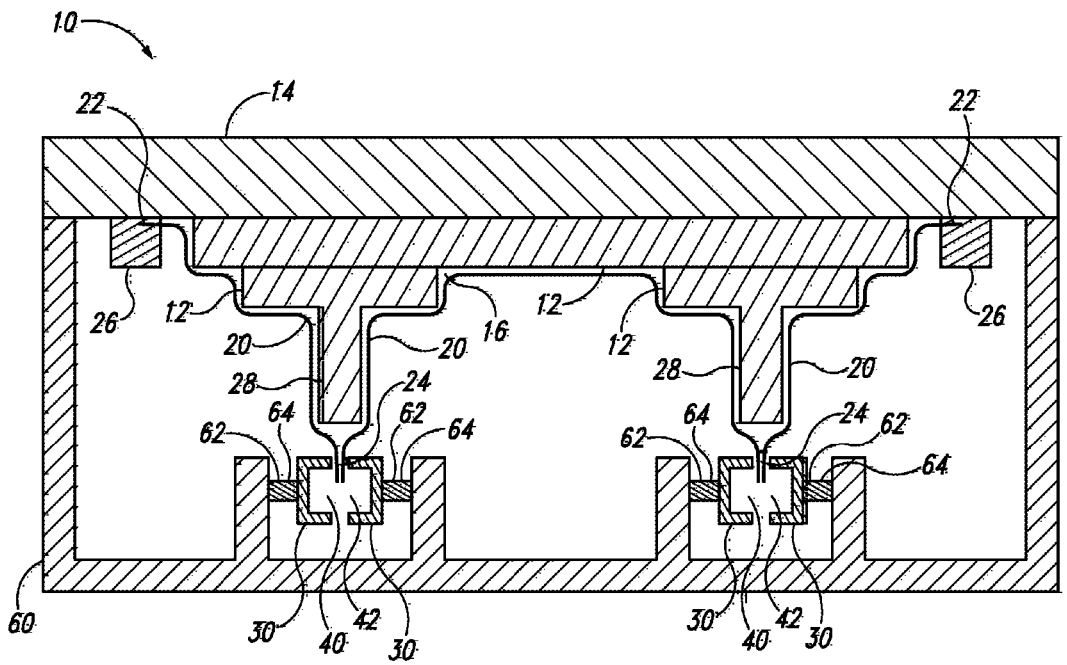
FIG. 6 is a schematic cross section of an illustrative, non-exclusive example of apparatuses for efficient sealing of vacuum bag seams.

FIG. 6 depicts an illustrative, non-exclusive example of an apparatus 10 in which a composite part 12 is covered by at least two vacuum bags 20 with edges 22 that are sealed together in a seam 24 by a compression seal applied by one or more edge sealing frames 30. More specifically, FIG. 6 illustrates three vacuum bags 20, a multicomponent composite part 12 with two protrusions 28, and a seam 24 associated with each protrusion 28. Other numbers and configurations of vacuum bags 20, composite parts 12, protrusions 28, and/or seams 24 are within the scope of the present disclosure. For example, multiple vacuum bags 20 may be used to span the surface of large composite parts 12, such as a portion of an aircraft wing. As another example, the composite part 12 may be a skin co-formed with a series of stringers (which are protrusions 28 from the skin).

In the example of FIG. 6, the vacuum bag edges 22 that surround the periphery of the composite part 12 on the base 14 are sealed to the base 14 by sealant 26. Also in this example, apparatus 10 includes a frame 60 that is configured to support one or more edge sealing frames 30 below the composite part 12 proximate to adjacent edges 22 of adjacent vacuum bags 20 (and generally proximate to protrusion 28). Though the edge sealing frames 30 are illustrated below the composite part 12 in FIG. 6, the composite part 12 and the edge sealing frames 30 may have different relative locations and/or may be oriented differently relative to gravity. For example, the protrusions 28 may generally face upwards and the frame 60 may support at least one edge sealing frame 30 above the composite part 12.

The edge sealing frames 30 are configured to form one or more seams 24 between the edges 22. Edge sealing frames 30 are supported on the frame 60 by one or more supports 62 which may be configured to position the edge sealing frame 30, in the open configuration 46, around the edges 22. The supports 62 may be configured to transition the edge sealing frame 30 from the open configuration 46 to the closed configuration 44, compressing the edges 22 into a seam 24. The supports 62 may be configured to position and/or configured to transition by being flexible, biased, extensible, and/or actuated. The supports 62 and/or the edge sealing frames 30 may be moved, translated, and/or oriented by an actuator 64 (e.g., electrical, mechanical, hydraulic, and/or pneumatic actuators). For example, supports 62 may include an actuator 64 with an air bladder that is inflated to force the edge sealing frames 30 together into the closed configuration 44. Once the edge sealing frames 30 are in the closed configuration 44, sealing vacuum may be applied to the sealed region 40, forming a vacuum-tight compression seal around the seam 24. Once vacuum is applied to the sealed region 40, the air bladder may be deflated, resulting in the edge sealing frames 30 generally decoupling from the frame 60 (e.g., the edge sealing frames 30 are free floating or at least not rigidly connected to the frame 60). With the edge sealing frames 30 generally decoupled from the frame 60, and primarily coupled to the vacuum bags 20, the edge sealing frames 30 may accommodate changes in composite part 12 geometry while the composite part 12 is processed (cured).

Figure 7:
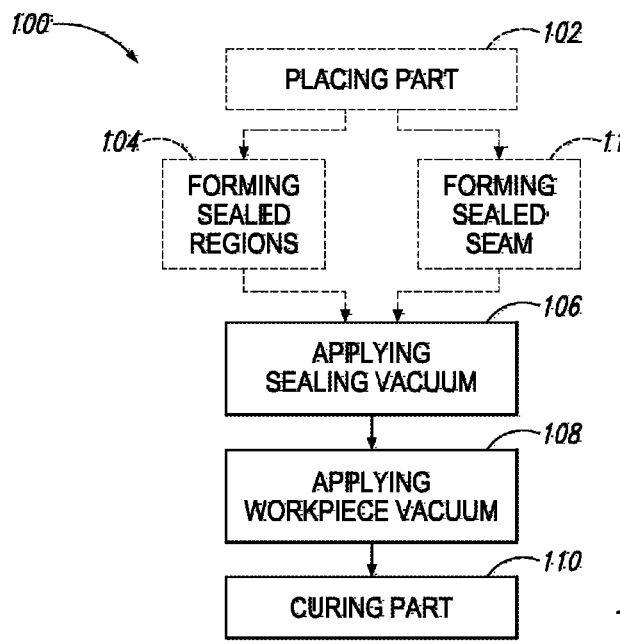
FIG. 7 is a diagram of methods of manufacturing a composite part.

FIG. 7 outlines methods 100 for manufacturing a composite part. Methods 100 comprise forming 104 at least two sealed regions and/or forming 114 a sealed seam separating at least two regions (at least one sealed region). Methods 100 also comprise curing 110 the composite part (also referred to as processing the composite part). Methods 100 may comprise placing 102 an uncured composite part on a base (e.g., placing uncured composite part 12 on base 14). As used herein, an uncured composite part is a part before curing 110 is performed. Likewise, a cured composite part is a part that results from curing 110, as described further herein.

One of the regions formed by forming 104 and/or forming 114 is a sealed region (also called a first sealed region or a workpiece sealed region) that covers and/or encloses the uncured composite part, e.g., the sealed region 16. The second of the regions (also called a second sealed region of a sealed seam region if sealed) may be outside of the first sealed region and/or may include, and/or may be adjacent to, the seam, e.g., sealed region 40. The two regions are substantially fluidically isolated from each other such that a vacuum may be maintained at least in the first sealed region.

Forming 104 at least two sealed regions may include covering the uncured composite part with one or more vacuum bags and sealing the vacuum bags by one or more seams around the uncured composite part on a base to form a first sealed region (e.g., sealed region 16). Each seam includes at least a portion of an edge of a vacuum bag. The seams may be formed between one of the edges of the vacuum bags and the base and/or between two or more edges of the vacuum bags. At least one of the seams is sealed with a compression seal applied by an edge sealing frame (e.g., edge sealing frame 30) that defines a second sealed region (e.g., sealed region 40) outside of the first sealed region. The seam(s) sealed with a compression seal may be sealed with a vacuum moat and/or without any sealant. The seam(s) sealed without a compression seal, if any, may be sealed with a sealant or other bond. For example, seams to the base may be formed and sealed with sealant, while seams between vacuum bags may be formed and sealed with a compression seal applied by edge sealing frame(s).

Forming 104 may include sealing the at least one of the seams by applying 106 sealing vacuum to the second sealed region. Forming 104 may include sealing the at least one of the seams by clamping the edge sealing frame to the seam. The edge sealing frame may be clamped to one or more edges of the vacuum bags and/or to the base.

Forming 114 a sealed seam separating at least two regions may include forming the sealed seam by compression seal (e.g., a compression seal applied by an edge sealing frame such as edge sealing frame 30). The sealed seam includes at least one edge of the vacuum bags. The vacuum bags and the sealed seam cooperate to form at least a part of a sealed region (a workpiece region) enclosing the uncured composite part. The sealed seam substantially separates and/or isolates the workpiece region from the rest of the environment, allowing a vacuum to be maintained in the workpiece region.

Forming 114 may include sealing a seam, and/or the sealed seam may be further sealed, by applying 106 sealing vacuum to the seam, and/or the sealed seam, outside of the sealed workpiece region. For example, the seam may be sealed by an edge sealing frame that defines a sealed seam region enclosing the seam. Sealing vacuum may be applied to the sealed seam region to seal, or to further seal, the seam. Additionally or alternatively, forming 114 may include sealing a seam by clamping an edge sealing frame to the seam to create the sealed seam. Because the sealed seam is formed by compression seal, the sealed seam may be formed without any sealant.

Methods 100 further comprise applying 108 workpiece vacuum to the sealed workpiece region (the first sealed region). Applying 108 workpiece vacuum may result in compacting and/or consolidating the uncured composite part. Workpiece vacuum may be applied by connecting a source of vacuum (e.g., source of vacuum 54) to the workpiece region (e.g., via vacuum port 50). Applying 108 workpiece vacuum may result in a gas pressure in the workpiece region of less than 50 kPa, 10 kPa, 3 kPa, or 1 kPa, i.e., a vacuum of greater than −0.5 bar, −0.9 bar, −0.97 bar, or −0.99 bar.

Methods 100 further comprise applying 106 sealing vacuum outside of the workpiece region (e.g., to the second sealed region and/or to the sealed seam region). Applying 106 sealing vacuum may form a vacuum moat around at least a portion of the workpiece region. The sealing vacuum may be applied by connecting a source of vacuum (e.g., source of vacuum 54) to the second sealed region and/or to the sealed seam region (e.g., via vacuum port 52). Applying 106 sealing vacuum may result in a gas pressure outside of the workpiece region of less than 50 kPa, 10 kPa, 3 kPa, or 1 kPa, i.e., a vacuum of greater than −0.5 bar, −0.9 bar, −0.97 bar, or −0.99 bar.

Though FIG. 7 illustrates applying 106 sealing vacuum generally before applying 108 workpiece vacuum, applying 106 and applying 108 may be performed in any order. For example, applying 108 workpiece vacuum may be started and/or completed before applying 106 sealing vacuum. Applying 106 sealing vacuum and applying 108 workpiece vacuum may be performed at least partially concurrently, for example substantially simultaneously.

Methods 100 further comprise curing 110 the uncured composite part to form a cured composite part. Curing 110 (also referred to as processing) may include bonding, hardening, and/or toughening the uncured composite material in the composite part by chemically curing, binding, compacting, laminating, consolidating, thermoforming, polymerizing, and/or cross linking the uncured composite material. Curing 110 may include adding and/or controlling the addition of chemical adjuncts, resin, uncured polymer, and/or one or more forms of energy such as ultraviolet radiation, heat, and pressure. Curing 110 may include placing the uncured composite part and attendant apparatus into an oven and/or an autoclave. Curing 110 may include heating the uncured composite part, for example at a temperature of greater than 20° C., 100° C., 150° C., or 200° C., less than 250° C., 200° C., 150° C., 100° C., or 40° C., and/or about 20° C., about 80° C., about 120° C., or about 180° C. Curing 110 may include applying pressure, e.g., gas pressure, to the uncured composite part from outside the sealed workpiece region and, when present, outside of the second sealed region and/or the sealed seam region. For example, pressure may be applied to the uncured composite part through a flexible vacuum bag. The pressure for curing 110 may be at least 0.1 MPa, 0.2 MPa, 0.3 MPa, 0.4 MPa, 0.5 MPa, 0.7 MPa, or 1 MPa.

Though FIG. 7 illustrates curing 110 generally after applying 106 sealing vacuum and applying 108 workpiece vacuum, applying 106 and applying 108 each independently may be performed at least partially concurrently with curing 110. For example, applying 106 and applying 108 may continue during curing 110.

Figure 8:
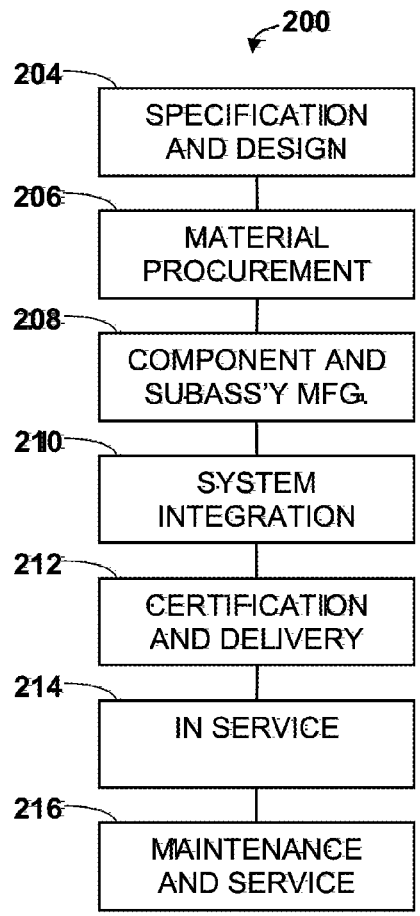
FIG. 8 is a flow diagram of aircraft production and service methodology.
Figure 9:
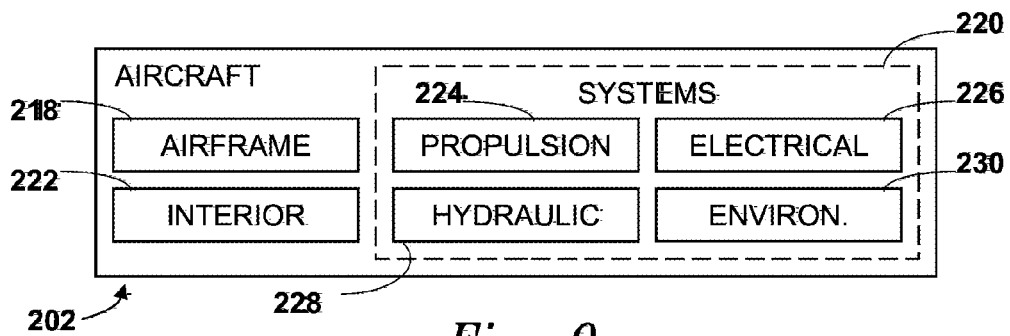
FIG. 9 is a block diagram of an aircraft.

Embodiments of the disclosure may find use in a variety of potential applications, particularly in the transportation industry, including for example, aerospace, marine and automotive applications. Thus, referring now to FIGS. 8-9, embodiments of the disclosure may be described in the context of an aircraft manufacturing and service method 200 as shown in FIG. 8 and an aircraft 202 as shown in FIG. 9. During pre-production, exemplary method 200 may include specification and design 204 of the aircraft 202 and material procurement 206. During production, component and subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 202 produced by exemplary method 200 may include an airframe 218 with a plurality of systems 220 and an interior 222. Examples of high-level systems 220 include one or more of a propulsion system 224, an electrical system 226, a hydraulic system 228, and an environmental system 230. Any number of other systems may be included. Although an aerospace example is shown, the principles of the invention may be applied to other industries, such as the automotive industry.

Apparatus and methods embodied herein may be employed during any one or more of the stages of the production and service method 200. For example, components or subassemblies corresponding to production process 208 may be fabricated or manufactured in a manner similar to components or subassemblies produced while the aircraft 202 is in service. Also, one or more apparatus embodiments, method embodiments, or a combination thereof may be utilized during the production stages 208 and 210, for example, by substantially expediting assembly of or reducing the cost of an aircraft 202. Similarly, one or more of apparatus embodiments, method embodiments, or a combination thereof may be utilized while the aircraft 202 is in service, for example and without limitation, to maintenance and service 216.

Illustrative, non-exclusive examples of inventive subject matter according to the present disclosure are described in the following enumerated paragraphs:

A1. An edge sealing frame for sealing a vacuum bag for composite part manufacturing, the edge sealing frame comprising:
a body;
a compliant periphery section; and
a vacuum port;
wherein the edge sealing frame is configured to define a sealed region encompassing a portion of a vacuum bag edge, and to seal a seam that includes the portion of the vacuum bag edge with a compression seal applied by the compliant periphery section, and wherein the vacuum port is operatively connected to the sealed region.

A2. The edge sealing frame of paragraph A1, wherein the edge sealing frame is configured to maintain a sealed volume within the sealed region when a pressure differential between the sealed region and a surrounding environment is at least 0.1 MPa, 0.2 MPa, 0.3 MPa, 0.4 MPa, 0.5 MPa, 0.7 MPa, or 1 MPa.

A3. The edge sealing frame of any of paragraphs A1-A2, wherein the edge sealing frame is configured to maintain a sealed volume within the sealed region at a temperature of greater than 20° C., 100° C., 150° C., or 200° C., less than 250° C., 200° C., 150° C., 100° C., or 40° C., and/or about 20° C., about 80° C., about 120° C., or about 180° C.

A4. The edge sealing frame of any of paragraphs A1-A3, wherein the edge sealing frame is configured to maintain a sealed volume within the sealed region when the sealed region is subject to evacuation, and optionally wherein the sealed volume includes space open to gas flow.

A5. The edge sealing frame of any of paragraphs A1-A4, wherein the sealed region includes a breather, optionally configured to permit gas flow through the sealed region.

A6. The edge sealing frame of any of paragraphs A1-A5, wherein the edge sealing frame is configured to seal the seam with a compression seal formed by evacuating the sealed region.

A7. The edge sealing frame of any of paragraphs A1-A6, wherein the compression seal is configured to be formed by external gas pressure forcing the compliant periphery section closed around the seam when the sealed region is evacuated.

A8. The edge sealing frame of any of paragraphs A1-A7, wherein the edge sealing frame is configured to seal the seam with a compression seal formed by clamping the compliant periphery section to the portion of the vacuum bag edge.

A9. The edge sealing frame of any of paragraphs A1-A8, wherein the compression seal is configured to be formed by external clamping force to close the compliant periphery section around the seam.

A10. The edge sealing frame of any of paragraphs A1-A9, wherein the compliant periphery section includes one or more of rubber, synthetic rubber, elastomer, fluoroelastomer, silicone, neoprene, nitrile, and VITON-brand fluoroelastomer.

A11. The edge sealing frame of any of paragraphs A1-A10, wherein the body includes a flexible portion, optionally wherein the flexible portion is at least one of a hinge, a flexure, and a living hinge.

A12. The edge sealing frame of any of paragraphs A1-A11, wherein the vacuum port is configured to evacuate and/or to vent the sealed region.

A13. The edge sealing frame of any of paragraphs A1-A12, wherein the seam includes a portion of a second vacuum bag edge.

B1. An apparatus for composite part manufacturing, the apparatus comprising:
a base;
an uncured composite part on the base; and
one or more vacuum bags covering the uncured composite part;
wherein the one or more vacuum bags are sealed by one or more seams to the base and/or to each other to form a first sealed region enclosing the uncured composite part between the base and/or the one or more vacuum bags, and wherein at least one seam of the one or more seams is sealed by an edge sealing frame that defines a second sealed region enclosing the at least one seam.

B2. The apparatus of paragraph B1, wherein the edge sealing frame is the edge sealing frame of any of paragraphs A1-A13.

B3. The apparatus of any of paragraphs B1-B2, wherein the base includes, or is, at least one of a tool, a form, a mold, an arbor, and a mandrel.

B4. The apparatus of any of paragraphs B1-B3, wherein the one or more vacuum bags is two or more, three or more, or four or more.

B5. The apparatus of any of paragraphs B1-B4, wherein the first sealed region has a gas pressure of less than 50 kPa, 10 kPa, 3 kPa, or 1 kPa.

B6. The apparatus of any of paragraphs B1-B5, wherein the second sealed region has a gas pressure of less than 50 kPa, 10 kPa, 3 kPa, or 1 kPa.

B7. The apparatus of any of paragraphs B1-B6, wherein the second sealed region forms a vacuum moat around the at least one seam.

B8. The apparatus of any of paragraphs B1-B7, wherein the at least one seam is sealed without a sealant.

B9. The apparatus of any of paragraphs B1-B8, wherein the edge sealing frame is clamped around the at least one seam.

B10. The apparatus of any of paragraphs B1-B9, wherein the at least one seam includes a portion of an edge of one of the one or more vacuum bags and a portion of the base.

B11. The apparatus of any of paragraphs B1-B10, wherein the at least one seam includes a portion of a first edge of the one or more vacuum bags and a portion of a second edge of the one or more vacuum bags.

B11.1. The apparatus of paragraph B11, wherein the one or more vacuum bags are sealed to the base with an adhesive sealant.

B11.2. The apparatus of any of paragraphs B11-B11.1, wherein the first edge and the second edge are adjacent edges, or are adjacent to each other.

B11.3. The apparatus of any of paragraphs B11-B11.2, wherein the first edge and the second edge are edges of adjacent vacuum bags, or vacuum bags that are adjacent to each other.

B11.4. The apparatus of any of paragraphs B11-B11.2, wherein the first edge and the second edge are edges of the same vacuum bag.

B12. The apparatus of any of paragraphs B1-B11.4, further comprising a vacuum port operatively connected to the first sealed region, optionally wherein the vacuum port is configured to evacuate and/or to vent the first sealed region.

C1. A method of manufacturing a composite part, the method comprising:
placing an uncured composite part on a base;
forming a first sealed region by covering the uncured composite part with one or more vacuum bags and sealing the vacuum bags by one or more seams to the base and/or each other around the uncured composite part, wherein each seam includes at least a portion of an edge of the one or more vacuum bags, and wherein the sealing includes sealing at least one seam with a compression seal applied by an edge sealing frame that defines a second sealed region encompassing the at least one seam;

applying workpiece vacuum to the first sealed region;
applying sealing vacuum to the second sealed region; and
curing the uncured composite part to form a cured composite part.

C2. The method of paragraph C1, wherein the edge sealing frame is the edge sealing frame of any of paragraphs A1-A13.

C3. The method of any of paragraphs C1-C2, wherein the base includes, or is, at least one of a tool, a form, a mold, an arbor, and a mandrel.

C4. The method of any of paragraphs C1-C3, wherein the forming includes sealing the at least one seam by the applying sealing vacuum.

C5. The method of any of paragraphs C1-C4, wherein the at least one seam is sealed without a sealant.

C6. The method of any of paragraphs C1-05, wherein the forming includes sealing the at least one seam by clamping the edge sealing frame to the at least one seam, and optionally by clamping the edge of one of the one or more vacuum bags to the base and/or the edge of another of the one or more vacuum bags.

C7. The method of any of paragraphs C1-C6, wherein the at least one seam includes a portion of a first edge of the one or more vacuum bags and a portion of a second edge of the one or more vacuum bags.

C7.1. The method of paragraph C7, wherein the forming includes sealing the one or more vacuum bags to the base with an adhesive sealant and sealing the first edge and the second edge with a compression seal applied by the edge sealing frame.

C7.2. The method of any of paragraphs C7-C7.1, wherein the first edge and the second edge are adjacent edges, or are adjacent to each other.

C7.3. The method of any of paragraphs C7-C7.2, wherein the first edge and the second edge are edges of adjacent vacuum bags, or vacuum bags that are adjacent to each other.

C7.4. The method of any of paragraphs C7-C7.2, wherein the first edge and the second edge are edges of the same vacuum bag.

C8. The method of any of paragraphs C1-C7.4, wherein the applying workpiece vacuum results in compacting and/or consolidating the uncured composite part.

C9. The method of any of paragraphs C1-C8, wherein the applying workpiece vacuum results in a gas pressure in the first sealed region of less than 50 kPa, 10 kPa, 3 kPa, or 1 kPa.

C10. The method of any of paragraphs C1-C9, wherein the applying sealing vacuum results in a gas pressure in the second sealed region of less than 50 kPa, 10 kPa, 3 kPa, or 1 kPa.

C11. The method of any of paragraphs C1-C10, wherein the applying sealing vacuum forms a vacuum moat at least partially around the first sealed region.

C12. The method of any of paragraphs C1-C11, wherein the applying sealing vacuum is begun before the applying workpiece vacuum.

C13. The method of any of paragraphs C1-C12, wherein the applying sealing vacuum and the applying workpiece vacuum are performed at least partially concurrently.

C14. The method of any of paragraphs C1-C13, wherein the curing includes consolidating the uncured composite part.

C15. The method of any of paragraphs C1-C14, wherein the curing includes heating the uncured composite part, optionally at a temperature of greater than 20° C., 100° C., 150° C., or 200° C., less than 250° C., 200° C., 150° C., 100° C., or 40° C., and/or about 20° C., about 80° C., about 120° C., or about 180° C.

C16. The method of any of paragraphs C1-C15, wherein the curing includes applying gas pressure to the uncured composite part from outside of the first sealed region and the second sealed region, optionally wherein the gas pressure is at least 0.1 MPa, 0.2 MPa, 0.3 MPa, 0.4 MPa, 0.5 MPa, 0.7 MPa, or 1 MPa.

D1. A method of manufacturing a composite part, the method comprising:

forming a sealed seam by compression seal, wherein the sealed seam includes at least one edge of a vacuum bag, wherein the vacuum bag defines at least part of a sealed workpiece region enclosing an uncured composite part;
applying sealing vacuum to the sealed seam outside of the sealed workpiece region;
applying workpiece vacuum to the sealed workpiece region; and
curing the uncured composite part to form a cured composite part.

D2. The method of paragraph D1, wherein the forming includes forming the sealed seam by compression seal with an edge sealing frame, optionally the edge sealing frame of any of paragraphs A1-A13.

D2.1. The method of paragraph D2, wherein the edge sealing frame defines a sealed seam region enclosing the seam.

D3. The method of any of paragraphs D1-D2.1, wherein the uncured composite part is on a base, optionally that includes, or is, at least one of a tool, a form, a mold, an arbor, and a mandrel.

D4. The method of any of paragraphs D1-D3, wherein the forming includes sealing a seam by the applying sealing vacuum to create the sealed seam.

D5. The method of any of paragraphs D1-D4, wherein the sealed seam is sealed without a sealant.

D6. The method of any of paragraphs D1-D5, wherein the forming includes sealing a seam by clamping an/the edge sealing frame to the seam to create the sealed seam.

D7. The method of any of paragraphs D1-D6, wherein the sealed seam includes a portion of a first edge of the vacuum bag and a portion of a second edge of the vacuum bag, optionally wherein the first edge and the second edge are adjacent edges, or are adjacent to each other.

D8. The method of any of paragraphs D1-D7, wherein the sealed workpiece region is at least partially defined by a first vacuum bag and a second vacuum bag, wherein the sealed seam includes a portion of an edge of the first vacuum bag and a portion of an edge of the second vacuum bag, and optionally wherein the first vacuum bag and the second vacuum bag are adjacent vacuum bags, or vacuum bags that are adjacent to each other.

D9. The method of any of paragraphs D1-D8, wherein the applying workpiece vacuum results in compacting and/or consolidating the uncured composite part.

D10. The method of any of paragraphs D1-D9, wherein the applying workpiece vacuum results in a gas pressure in the sealed workpiece region of less than 50 kPa, 10 kPa, 3 kPa, or 1 kPa.

D11. The method of any of paragraphs D1-D10, wherein the applying sealing vacuum results in a gas pressure neighboring the sealed seam, and/or optionally in a/the sealed seam region, of less than 50 kPa, 10 kPa, 3 kPa, or 1 kPa.

D12. The method of any of paragraphs D1-D11, wherein the applying sealing vacuum forms a vacuum moat at least partially around the sealed workpiece region.

D13. The method of any of paragraphs D1-D12, wherein the applying sealing vacuum is begun before the applying workpiece vacuum.

D14. The method of any of paragraphs D1-D13, wherein the applying sealing vacuum and the applying workpiece vacuum are performed at least partially concurrently.

D15. The method of any of paragraphs D1-D14, wherein the curing includes consolidating the uncured composite part.

D16. The method of any of paragraphs D1-D15, wherein the curing includes heating the uncured composite part, optionally at a temperature of greater than 20° C., 100° C., 150° C., or 200° C., less than 250° C., 200° C., 150° C., 100° C., or 40° C., and/or about 20° C., about 80° C., about 120° C., or about 180° C.

D17. The method of any of paragraphs D1-D16, wherein the curing includes applying gas pressure to the uncured composite part from outside of the sealed workpiece region, and optionally a/the sealed seam region, optionally wherein the gas pressure is at least 0.1 MPa, 0.2 MPa, 0.3 MPa, 0.4 MPa, 0.5 MPa, 0.7 MPa, or 1 MPa.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function. Further, as used herein, the singular forms "a", "an" and "the" may be intended to include the plural forms as well, unless the context clearly indicates otherwise.

The various disclosed elements of apparatuses and steps of methods disclosed herein are not required of all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of manufacturing a composite part, the method comprising:

placing an uncured composite part on a base;

forming a first sealed region by covering the uncured composite part with one or more vacuum bags and sealing the one or more vacuum bags by one or more seams to the base and/or each other around the uncured composite part, wherein each seam of the one or more seams includes at least a portion of an edge region of the one or more vacuum bags, and wherein the sealing includes sealing at least one seam of the one or more seams with a compression seal applied by an edge sealing frame that defines at least a part of a second sealed region encompassing a periphery of the edge region of the one or more vacuum bags of the at least one seam of the one or more seams, wherein the edge sealing frame has a rigid body, wherein the sealing the at least one seam of the one or more seams with a compression seal includes applying pressure with the rigid body of the edge sealing frame to the at least one seam of the one or more seams to form the compression seal, and wherein only the first sealed region encompasses the uncured composite part;

applying workpiece vacuum to the first sealed region;

applying sealing vacuum to the second sealed region; and curing the uncured composite part to form a cured composite part.

2. The method of claim 1, wherein the forming includes sealing the at least one seam of the one or more seams by the applying sealing vacuum.

3. The method of claim 1, wherein the at least one seam of the one or more seams is sealed without a sealant.

4. The method of claim 1, wherein the edge region of the one or more vacuum bags is a first edge region, wherein the at least one seam of the one or more seams includes a portion of the first edge region of the one or more vacuum bags and a portion of a second edge region of the one or more vacuum bags.

5. The method of claim 1, wherein the applying workpiece vacuum results in a gas pressure in the first sealed region of less than 1 kPa.

6. The method of claim 1, wherein the applying sealing vacuum results in a gas pressure in the second sealed region of less than 50 kPa.

7. The method of claim 1, wherein the curing includes heating the uncured composite part.

8. The method of claim 1, wherein the curing includes applying gas pressure to the uncured composite part from outside of the first sealed region and the second sealed region, wherein the gas pressure is at least 0.2 MPa.

9. A method of manufacturing a composite part, the method comprising:

forming a sealed seam, with an edge sealing frame that has a rigid body, by compression seal at an edge region of a vacuum bag, wherein the forming the sealed seam by compression seal includes applying pressure with the rigid body of the edge sealing frame to the edge region of the vacuum bag, wherein the vacuum bag and the sealed seam define at least part of a sealed workpiece region enclosing an uncured composite part, and wherein the edge sealing frame defines a sealed seam region that encloses the sealed seam;

applying sealing vacuum to the sealed seam in the sealed seam region, wherein the sealed seam region encloses a periphery of the edge region of the vacuum bag and is outside of the sealed workpiece region and wherein only the sealed workpiece region encompasses the uncured composite part;

applying workpiece vacuum to the sealed workpiece region; and curing the uncured composite part to form a cured composite part.

10. The method of claim 9, wherein the vacuum bag is a first vacuum bag, wherein the sealed workpiece region is at least partially defined by the first vacuum bag and a second vacuum bag, wherein the sealed seam includes a portion of the edge region of the first vacuum bag and a portion of an edge region of the second vacuum bag.

11. The method of claim 9, wherein the applying workpiece vacuum results in a gas pressure in the sealed workpiece region of less than 1 kPa.

12. The method of claim 9, wherein the applying sealing vacuum results in a gas pressure neighboring the sealed seam of less than 50 kPa.

13. The method of claim 9, wherein the curing includes heating the uncured composite part.

14. The method of claim 9, wherein the curing includes applying gas pressure to the uncured composite part from outside of the sealed workpiece region, wherein the gas pressure is at least 0.2 MPa.

15. A method of manufacturing a composite part, the method comprising:
   covering an uncured composite part with a vacuum bag to form a first region enclosing the uncured composite part between the vacuum bag and a base;
   placing an edge sealing frame at an edge region of the vacuum bag to form a second region enclosing a periphery of the edge region of the vacuum bag, wherein the edge sealing frame has a rigid body, and wherein only the first region encompasses the uncured composite part;
   applying workpiece vacuum to the first region to form a first sealed region;
   applying sealing vacuum to the second region to form a second sealed region and to form a compression seal at the edge region of the vacuum bag with the edge region of the vacuum bag compressed between the rigid body of the edge sealing frame and the base; and
   curing the uncured composite part to form a cured composite part.

16. The method of claim 15, wherein the applying sealing vacuum forms a vacuum moat at least partially around the first sealed region.

17. The method of claim 15, wherein the curing includes applying gas pressure to the uncured composite part from outside of the first sealed region and the second sealed region, wherein the gas pressure is at least 0.2 MPa.

* * * * *